US00RE49844E

(19) United States
(12) Reissued Patent
Toom

(10) Patent Number: US RE49,844 E
(45) Date of Reissued Patent: Feb. 20, 2024

(54) CONTINUOUS HIGH RESOLUTION SURFACE PROFILING APPARATUS AND METHOD

(71) Applicant: Paul Toom, Delta (CA)

(72) Inventor: Paul Toom, Delta (CA)

(73) Assignee: Paul Toom, Delta (CA)

(21) Appl. No.: 17/159,000

(22) Filed: Jan. 26, 2021

Related U.S. Patent Documents

Reissue of:
(64) Patent No.: 9,404,738
Issued: Aug. 2, 2016
Appl. No.: 13/870,287
Filed: Apr. 25, 2013

(51) Int. Cl.

| | |
|---|---|
| ***G01B 11/24*** | (2006.01) |
| ***G01B 5/25*** | (2006.01) |
| ***G01B 5/28*** | (2006.01) |
| ***G01B 21/20*** | (2006.01) |
| ***G01C 7/04*** | (2006.01) |

(52) U.S. Cl.
CPC ..... *G01B 11/24* (2013.01); *G01B 5/285* (2013.01); *G01B 21/20* (2013.01); *G01C 7/04* (2013.01)

(58) Field of Classification Search
CPC ..... G01B 11/24; G01B 5/285; G01B 21/20; G01C 7/04
See application file for complete search history.

(56) References Cited

U.S. PATENT DOCUMENTS

| | | | | |
|---|---|---|---|---|
| 3,056,209 A | | 10/1962 | Oliver | |
| 4,741,207 A | | 5/1988 | Spangler | |
| 4,858,329 A | | 8/1989 | Manor | |
| 5,107,598 A | * | 4/1992 | Woznow | G01C 7/04 73/146 |

(Continued)

FOREIGN PATENT DOCUMENTS

| | | | |
|---|---|---|---|
| JP | 2000180148 A | * | 6/2000 |
| WO | PCT/AU94/00578 | | 4/1995 |

OTHER PUBLICATIONS

Surface Systems & Instruments CS8860 Walking profiler brochure published by Surface Systems & Instruments, Inc., found at www.smoothroad.com/products/walking, accessed on Jul. 10, 2013.

(Continued)

*Primary Examiner* — Karin Reichle

(74) *Attorney, Agent, or Firm* — Paul R. Smith; Oyen Wiggs Green & Mutala LLP

(57) ABSTRACT

A surface profiler including at least one front support wheel and at least one rear support wheel for travelling along the surface of a profile to be measured, the rotational axes of said wheels being longitudinally spaced, and the wheels contacting the surface being profiled in a collinear manner. A frame carried on the wheels carries at least one inclinometer and at least two vertical distance measuring apparatus such as lasers, and may also carry an optical encoder. The lasers are collinear with each other and with the wheels. Incremental [to] measurements of inclination angles provided by the inclinometer, together with incremental measurements of distance to the surface being measured provided by the lasers, produce a continuous, high resolution mathematical series of elevations representing the surface profile, including reproduction of surface features that are smaller than the distance between the wheels.

14 Claims, 11 Drawing Sheets

(56) References Cited

U.S. PATENT DOCUMENTS

| | | | | |
|---|---|---|---|---|
| 5,255,561 | A * | 10/1993 | Fleming | G01B 7/345 73/146 |
| 5,440,923 | A * | 8/1995 | Amberg | G01C 7/04 73/146 |
| 5,535,143 | A | 7/1996 | Face | |
| 6,618,954 | B2 * | 9/2003 | Kumazawa et al. | 33/533 |
| 6,647,636 | B2 * | 11/2003 | Fukuhara et al. | 33/521 |
| 6,682,261 | B1 * | 1/2004 | Karamihas | E01C 23/07 299/1.5 |
| 6,775,914 | B2 | 8/2004 | Toom | |
| 7,044,680 | B2 | 5/2006 | Godbersen et al. | |
| 7,748,264 | B2 | 7/2010 | Prem | |
| 8,417,423 | B2 * | 4/2013 | Fudala | G05D 1/0272 701/50 |
| 9,869,064 | B2 * | 1/2018 | Akashi | G01B 11/30 |
| 2002/0129505 | A1 * | 9/2002 | Airey | G01B 3/12 33/521 |
| 2002/0176608 | A1 | 11/2002 | Rose | |
| 2008/0219764 | A1 * | 9/2008 | Prem | E01C 23/01 404/72 |
| 2011/0220781 | A1 * | 9/2011 | Batchelder | G01D 5/34715 250/231.13 |
| 2014/0207411 | A1 * | 7/2014 | Laurent | G01B 11/26 702/158 |

OTHER PUBLICATIONS

Surface Systems & Instruments CS8800 Walking profiler brochure published by Surface Systems & Instruments. Inc., found at www.smoothroad.com/products/walking, accessed on Jul. 10, 2013.

* cited by examiner

Amended

Fig. 5. Comparative Wavelength Responses Using Inclinometer Only (No Lasers) vs 1 Middle Laser + Inclinometer (W = 0.250 m, L = 0.025 m)

Fig. 6. Comparative Wavelength Responses Using 2 Lasers + Inclinometer and Inclinometer Only (W = 0.250 m, L = 0.025 m)

Fig. 7. Comparative Profile Outputs for a 0.16 m Wide Bump Input Using Inclinometer Only and 2 Lasers + Inclinometer (W = 0.250 m, L = 0.025 m)

Fig. 10 Comparative Wavelength Response Contributions of Inclinometers and 2 Lasers (W = 0.250 m, L = 0.025 m)

CONTINUOUS HIGH RESOLUTION SURFACE PROFILING APPARATUS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue application of U.S. Pat. No. 9,404,738, which was filed on Apr. 25, 2013 and issued Aug. 2, 2016.*

FIELD OF THE INVENTION

The invention relates generally to surveying instruments. More specifically the invention relates to a surface profiler for determining the contour and characteristics of a surface.

BACKGROUND OF THE INVENTION

In surface profiling, a surface contour or profile is acquired by measuring the elevation of the surface at intervals along the surface. Surface profiling methods include either non-contact methods using optical (e.g. laser) or ultrasonic transducers, or contact-based methods using ground-engaging apparatus.

Contact-based profilers are generally characterized either as the walking or the rolling type. Walking profilers include those having spaced ground-engaging "feet" or pads that are alternately brought into engagement with the surface to be measured, as the profiler is moved over a distance. An example of a walking profiler is shown in U.S. Pat. No. 7,748,264 to Prem. The majority of contact-based profilers are of the rolling type. Rolling profilers travel on wheels over the surface to be profiled. They may be manually propelled by a walking operator, or driven or towed by a vehicle. Profilers that are propelled by a walking operator, even though they may use only wheels to contact the surface to be profiled, are also commonly called "walking" profilers. Such a profiler is disclosed in U.S. Pat. No. 6,775,914 to Toom.

Walking profilers may generally be further divided into two main types. One type typically includes a frame supported on wheels and an inclinometer, pendulum or other means to measure the inclination of the entire profiler's frame. A second type generally also comprises a frame supported on wheels, and further includes one or more separate marker or sensing wheels that do not support the profiler but are connected to a transducer for direct sensing of the position of the marker wheel in relation to the supporting wheels. A relatively common prior art approach for profilers of the latter type is to provide load bearing wheels at the front and rear ends of a frame and ground-engaging sensing means mounted between the load bearing wheels. Such an apparatus is exemplified by U.S. Pat. No. 5,535,143 to Face.

A surface profiler acquires a surface contour or profile by measuring the elevation of the surface at constant distance intervals along the surface, relative to a starting elevation. Sampling the elevation in this manner produces a mathematical series of elevations, which collectively represent the physical surface along a specific line. The series can be used for a number of purposes relating to construction or ongoing management of the surface.

U.S. Pat. No. 4,741,207 to Spangler discloses a vertical distance measuring device mounted to a vehicle, which takes the form of a transducer that measures the distance to the road surface by reference to the vehicle's suspension system. However, in order for the device to produce a profile, it is first necessary to determine a stable artificial plane of reference by double integrating the signal from a vertically oriented accelerometer and then to use the distance measuring device to measure from the artificial plane of reference to the pavement. This method and apparatus describe what has come to be known as an "inertial profiler", because of the inertial nature of the vertically oriented accelerometer sensor, which is fundamental to deriving the artificial plane of reference. In the case of low speed profilers, it is not possible to create a stable artificial plane of reference since drift inherent to the technique will invalidate the reference over the fairly long period of manual data collection. This is because of limitations of the inertial accelerometers used to measure the acceleration normal to the road surface. Vertical acceleration is caused by profile "pushing" the profiler up or down in response to horizontal movement over the profile at fairly constant speeds. If the horizontal speed is low, the vertical acceleration will be correspondingly low. At the fairly low operating speed of a walking profiler (typically about 4 km/hour, depending on the roughness of the profile), the vertical acceleration would be much less than 1 G (the acceleration of earth's gravity). Based on current accelerometer technology, this would result in a very low signal relative to noise, bias drift and other sources of error. The double integration of this weak signal would tend to yield an error value that would grow over the long profiling duration of, for example, 15 minutes required to collect data for a 1 km profile.

Various mathematical algorithms can be applied to the elevation series to calculate indices that are representative of the roughness or smoothness of the surface. The roughness relates to the discomfort that would be experienced by a passenger riding in a real or simulated vehicle that rolls over the surface. One of these indices is the International Roughness Index (IRI), which models the suspension of a nominal quarter of an automobile that is rolled over the surface within a computer model. The IRI algorithm computes the total travel of the quarter car's suspension per unit of distance traveled while rolling over the subject profile—the greater the travel, the higher the IRI value or roughness. IRI is increasingly being used for surface construction contract management. The quality of a newly constructed surface is compared to its contractual end product specification to determine if the finished surface is compliant with the specification. Construction contracts can be managed using surface profilers, with contract bonuses and penalties payable depending on profile test results. IRI is coming into use as the preferred index to determine profile quality. It should be apparent that instruments used to acquire the elevation series representing the actual surface profile that are used to calculate the IRI must therefore have high levels of accuracy and repeatability.

IRI is also being used for management of large-scale networks of roads within the jurisdictions of state departments of transport and highways, where non-contact surface profilers capable of collecting data at highway speeds are commonly being used. These are typically inertial profilers that measure elevation with reference to an inertial reference derived by double integrating the signal from a vertically oriented accelerometer. Due to their inherent limitations, such inertial profilers must be calibrated or verified against a benchmark reference or a more accurate profiling instrument to validate the data they acquire. Such benchmark devices have been defined by the United States Federal Highway Administration as "Reference Profilers".

In recent years, research and development into roads and applications of measured road profiles has resulted in the desire for more spectral detail within the profiles. This desire arises from the interest in studying the friction and other interactions between vehicle tires and surface textural features such as may be found in longitudinal and transverse tining, longitudinally ground pavements and those pavements that use very coarse granular materials such as chip seal and stone matrix asphalt.

Low speed contact-based manual reference profilers do not use vertically-oriented accelerometers to sense vertical acceleration of the vehicle frame to derive an artificial reference plane. Instead they use inclinometers to measure the longitudinal tilting of the vehicle frame as a basis for determining the elevation of the frame. The inclinometers are typically accelerometers that measure the vector component of the earth's acceleration in the horizontal direction (orthogonal to gravity) that results when they are not perfectly horizontal with respect to the plane of the earth. This method is therefore not speed dependent.

Reference profilers must be capable of measuring fine profile features having very short wavelengths. However, prior art profiling devices employing ground-engaging wheels and inclinometers are mathematically limited to measuring only wavelengths greater than the longitudinal distance between the rotational axes of [is] their wheels. Specifically, inclinometer-based profilers having a frame supported by a forward wheel and a rearward wheel spaced apart by wheelbase separation distance W have the following transfer function which provides the inclinometer signal gain H at different wavelengths λ, where the straight brackets signify the absolute value of the enclosed function:

$$H(\lambda) = \left| \frac{\sin\left(\frac{\pi W}{\lambda}\right)}{\frac{\pi W}{\lambda}} \right|$$

It can easily be seen that the gain falls to precisely zero where $\lambda=W$, since $\sin(\pi)=0$, and is very low for λ between 0 and W wavelength. This inclinometer-based profiler configuration is in fact an exact mechanical analog of a moving average filter having sample length of W, and the challenge presented is that the geometry of the profiler apparatus actually filters out the wavelengths that are of interest, namely those shorter than W.

It is therefore known to employ non-contact measuring devices to enhance the measuring capabilities of an inclinometer-based profiler. For example, U.S. Pat. No. 7,748,264 to Prem discloses the use of an array of laser-based height sensors attached to a frame. The frame is translated step by step longitudinally along the profile and provides a series of snapshots of the transverse profile along the longitudinal span. However, it will be noted that Prem is directed to transverse profile measurement. An inclinometer measures the transverse tilting of the frame but not the longitudinal tilting of the frame. Since no means are provided to accurately determine the longitudinal elevation differences of the frame it is not possible to derive a mathematical series that accurately represents the longitudinal elevation profile.

U.S. Pat. No. 7,044,680 to Godbersen et al. similarly discloses an apparatus to measure a surface profile using a series of paired lasers stretched transversely across the surface being profiled, attached to a moving vehicle. The frame is again translated step by step longitudinally along the profile, at relatively large 2 inch increments. The method requires fairly complex calculations and painstaking tracking of the locations of the x and y values at the front and rear of a measuring arm and thereafter careful tracking of changes in both of these values. An accurate starting datum is critical, and indeed Godbersen dedicates much of the patent specification to describing various methods for determining that information. The laser pairs are about 36 inches apart and the apparatus is therefore limited to detecting features having wavelengths of 36 inches even though the longitudinal measurement increments are shorter, because the spectral content of wavelengths in the recorded mathematical series representing the profile will still be limited to the spacing between the non-contact sensors. The transfer function of the apparatus is also described by the preceding formula for H(λ) and will be zero at the 36 inch spacing of the lasers, and close to zero at wavelengths smaller than 36 inches, making the 2 inch data sampling interval somewhat pointless in this range.

Further, the placement of the various pairs of lasers in a spaced relationship transversely across the surface being profiled leads to additional complications in the readings being taken and in the calculations necessary to produce useful data from those readings. In a system such as that disclosed in Godberson, where the distance measurement is not made at the mid-point between the non-contact sensors, an error may be introduced wherever the slope of the surface profile at the non-contact sensors differs from the slope at the location of the distance sensor. Small errors in the difference of the distance measured by the lasers become amplified in longer profiles leading to large end elevation errors. It is therefore necessary to reduce or eliminate the contribution of the non-contact sensors when measuring long distance profiles by filtering out the long wavelengths from the signals they provide, for example using high pass filtering to eliminate wavelengths longer than 10 meters, which also removes the DC (direct current) component of the signal. The inclinometer becomes the primary instrument for determining long wavelength profile features since it maintains accuracy for longer wavelengths. This can unnecessarily increase the complexity of the surface profiler.

Further, there are significant differences between the physics and geometry of inertial profilers and low speed contact-based manual reference profilers which make implementation of laser measurements to low speed contact-based profilers challenging. For example, Surface Systems & Instruments CS8800 Walking Profiler (http://www.smoothroad.com/products/walking/) is a surface profiler provided with a single lateral line scan laser attached to the frame to supplement the profile information gathered from the inclinometer. Such a single laser is generally attached to the mid-point of the frame and is directed downward so that it "sees" the ground underneath the profiler. However, the single laser is still incapable of measuring short wavelength features, and accordingly the CS8800 profiler must be provided with a contacting front arm apparatus. Further, since the frame rises and falls in response to the wheels' contact with the surface being measured, the measurement is not based on a stable plane of reference. If the distance measured by the laser is simply added to the profile generated from the inclinometer in an effort to "fill in" the missing response at distances smaller than the wheel spacing, the irregular wavelength response shown in FIG. 5 results: clearly the data obtained is inaccurate and of little practical use in the wavelength range shorter than the wheel spacing W. Consider also the situation shown in FIG. 8, where the profiler traverses a simple continuous sinusoidal profile with wavelength equal to the distance between the rotational axes of the wheels. When the profiler's wheels are resting on the crest of the sine wave the laser sees the full depth of the trough. When the profiler's wheels are resting on the trough of the sine wave, the laser sees the full height of the crest. The difference between the two gives a normalized gain of about 2 at this wavelength, representing a 100% error. At shorter wavelengths the response is erratic and overall this apparent solution is not at all useful. In summary, the distance measured by the vertical distance measuring device cannot simply be added to the profile derived by the inclinometer. Information provided by a single laser will at best be able to improve the resolution of the profiler making it capable of measuring features approximately half the size of the distance between the rotational axes of the wheels, that is, W/2.

It is therefore an object of this invention to provide a surface profile measuring apparatus that will address one or more of the issues present with currently available profilers.

It is further an objective of this invention to provide an apparatus and method to measure a surface profile continuously and with high resolution, meaning that very short wavelength profile features may be accurately identified and measured.

The present invention, given its high accuracy and repeatability, while finding uses in several industries and for many purposes, will be of particular value in both the contract management of new surface construction and as a reference standard for certification of other instruments.

These and other objects of the invention will be better understood by reference to the detailed description of the preferred embodiment which follows. Note that the objects referred to above are statements of what motivated the invention rather than promises. Not all of the objects are necessarily met by all embodiments of the invention described below or by the invention defined by each of the claims.

SUMMARY OF THE INVENTION

The invention provides an accurate surface profiling apparatus intended to be useful as a reference profiler, useful in calibrating the other profiling devices, and capable of determining profile features smaller than the wheel base of the profiler.

The surface profiling apparatus according to the invention comprises a frame supported on a pair of wheels, one or more devices for measuring inclination of the frame, and two or more devices for measuring the vertical distance to the surface being profiled. The apparatus may also comprise a device for measuring longitudinal distance travelled by the profiler. A third wheel may be attached to an arm extending transversely from the frame to provide stability and lateral support.

The vertical distance measuring devices, which are preferably optical triangulation lasers, are placed relatively close together, to capture short distances, which are defined herein as being distances shorter than the distance between the two supporting wheels. The profiler measures surface profile in a continuous method based on differential calculations using small distance increments to compute a continuous mathematical series of elevations at the [to] single mid-point of the lasers. The inclinometer defines a first angle and the lasers define a second angle; the sum of the angles is applied to the differential calculus calculation of the continuous mathematical series to compute the elevation at a given point on the profile.

In one aspect, the invention comprises a surface profiling apparatus comprising a frame; a plurality of wheels supporting the frame, at least two of the wheels being aligned to contact the surface being profiled in a longitudinally collinear manner; a longitudinal distance measuring apparatus supported by the frame; a longitudinal inclination measuring apparatus supported on the frame [to measure an angle $\alpha$ between the frame and the surface]; and at least two vertical distance measuring devices, the vertical distance measuring devices being collinear with the collinear wheels and separated by a distance L. The vertical distance measuring devices may be equidistant from the mid-point of the frame, and may be lasers. The lasers may be longitudinally spaced apart on the frame and may be attached to the frame at a specified separation, being shorter than the distance between the wheels. The longitudinal distance measuring apparatus may be positioned between the collinear wheels, and may be positioned between the vertical distance measuring apparatuses. The longitudinal distance measuring apparatus may be rotationally linked to an axle of one of the wheels, and may be an optical encoder. The longitudinal inclination measuring apparatus may be an inclinometer. The apparatus may further comprise a transverse inclination measuring apparatus, oriented substantially perpendicular to the longitudinal inclination measuring apparatus[, to measure a transverse angle $\chi$ between the frame and the surface.]

In a further aspect, the surface profiling apparatus may comprise attachment means by which it can be attached to a motorized drive means, which will move it along the surface to be profiled, and/or it may comprise a motorized drive means to move it along the surface to be profiled.

In yet a further aspect, the apparatus may comprise an operator interface to control the profiling apparatus. The interface may be associated with a cabinet associated with the frame, and the cabinet may house appropriate operational equipment, such as one or more internal sensors, a power supply, power level monitor, signal conditioning equipment, real time clock, distance pulse counters, digital input/output and multi-channel 16 bit analog to digital converter, computer and non-volatile memory.

In another aspect, the invention comprises a method of profiling a surface, the method comprising acquiring data relating to the longitudinal distance $\Delta D$ travelled by the profiler from a longitudinal distance measuring apparatus; the angle $\alpha$ of the frame from a longitudinal inclination measuring apparatus; and vertical distances $L_f$ and $L_r$ between the profiler and the surface at each of first and second vertical distance measuring apparatuses; calculating an incremental change in surface elevation $\Delta E$, using the formula:

$$\Delta E = \Delta D \sin\left(\alpha + \tan^{-1}\left(\frac{(L_f - L_r)}{L}\right)\right);$$

and adding the incremental change to an accumulated elevation series which represents a profile of the surface. The method may be applied at appropriate periodic intervals, which may be time increments, $\Delta t$, such as 1 millisecond, or longitudinal distance increments, $\Delta$, such as 1 millimeter. The invention may further comprise the step of acquiring data relating to the transverse angle $\chi$ of the frame from a transverse inclination measuring apparatus to correct cross-axis error.

In yet another aspect, the invention comprises a method of profiling a surface, the method comprising obtaining a vertical distance $L_f$ from a first vertical distance measuring device, and a vertical distance $L_r$ from a second vertical distance measuring device; calculating a first angle $\beta$ between the vertical distances $L_f$, $L_r$ and the distance L between the vertical distance measuring devices using the formula $$\beta = \tan^{-1}\left(\frac{(L_f - L_r)}{L}\right);$$

obtaining angle $\alpha$ from longitudinal inclination measuring apparatus; calculating an incremental change in surface elevation $\Delta E$, using the formula $\Delta E = \Delta D \sin(a+\beta)$; and adding the incremental change to an accumulated elevation The method may be applied at appropriate periodic intervals, which may be time increments, $\Delta t$, or longitudinal distance increments, $\Delta D$. The elevation may be corrected for cross-axis error by obtaining a transverse angle $\chi$ from a transverse inclination measuring apparatus supported by the profile.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The preferred embodiment of the invention will be described by reference to the drawings thereof in which.

DETAILED DESCRIPTION OF THE PREFERRED EMBODIMENT

Figure 1:
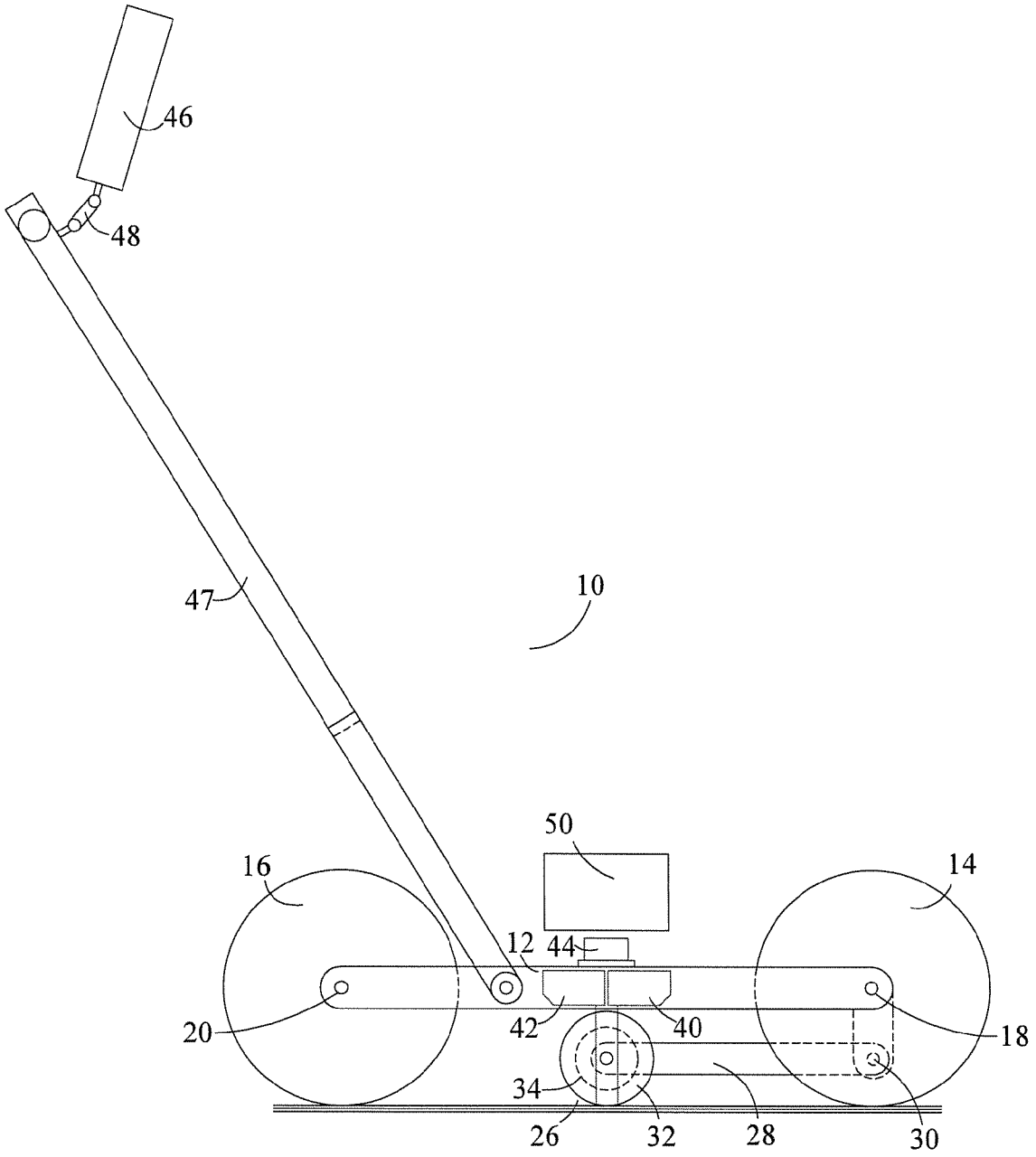
FIG. 1 is a side elevation view of the profiler according to an embodiment of the invention.
Figure 2:
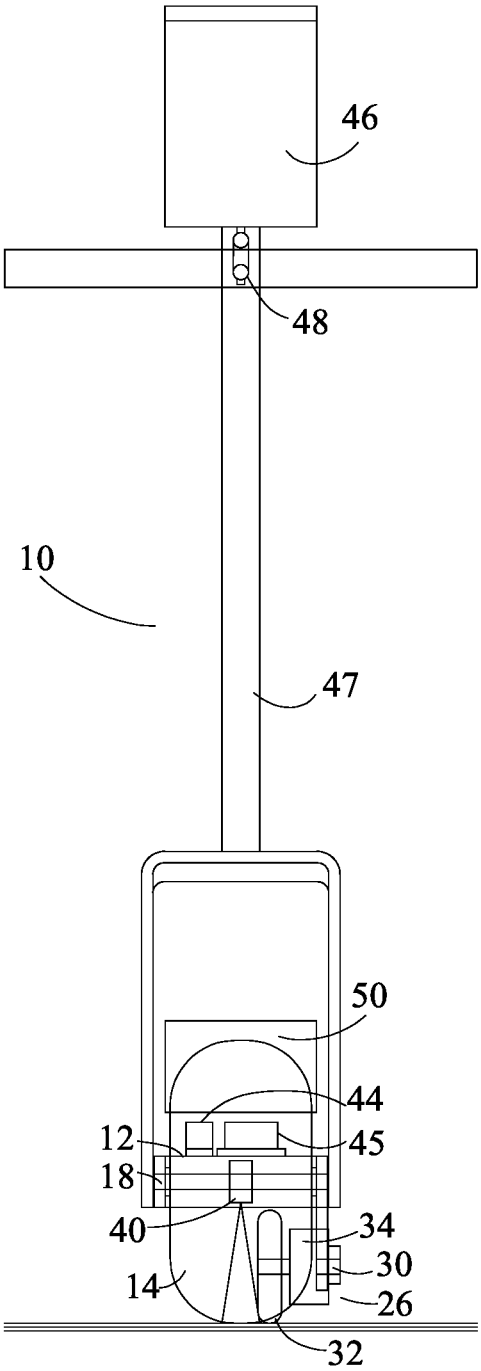
FIG. 2 is a front end view of the profiler according to an embodiment of the invention.
Figure 3:
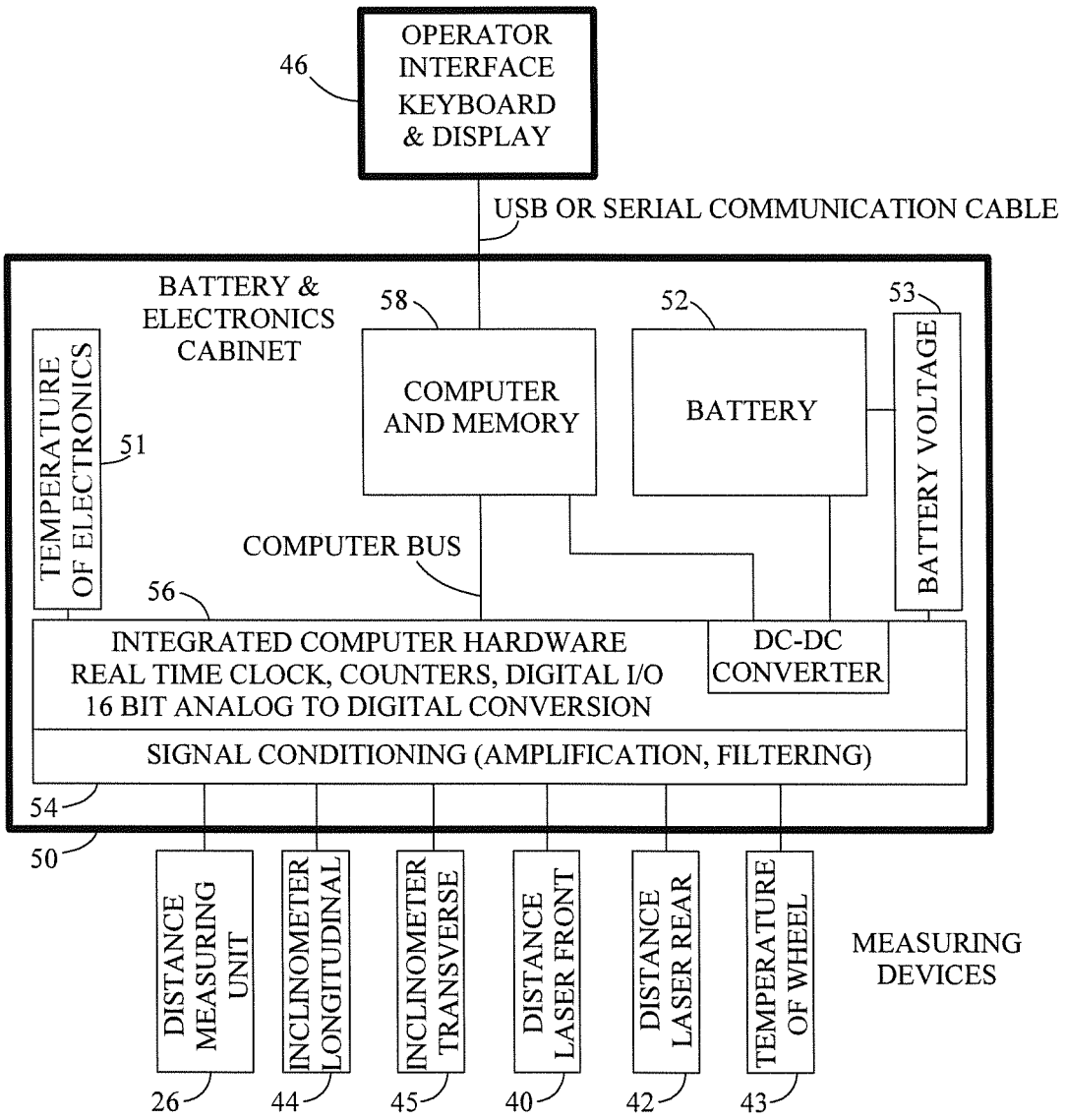
FIG. 3 is a block diagram of the control components of the profiler.

Referring to FIGS. 1 to 3, a surface profiler 10 according to the invention comprises a frame 12 which is supported by a front support wheel 14 and a rear support wheel 16.

Wheels 14, 16 are spaced apart longitudinally on the frame 12 and are collinear, for travel along the same line. They are mounted for rotation on axles 18, 20 that are supported on frame 12. A suitably strong and lightweight material, such as aluminum, is chosen to minimize the mass of the wheel hubs. A suitable wheel material, such as solid natural rubber, is chosen for durability, to keep wheel mass low and to provide compliance between the frame and the surface to be profiled, i.e. to average out micro-texture, and to reduce vibration from the wheels to the frame and instruments of the profiler. If additional stability is desired, a third wheel may be attached to an arm (not shown) that extends orthogonally from a side of the frame 12 in order to support the profiler 10 and prevent it from tipping to the side. Alternatively, the frame 12 of the profiler may be widened and the third wheel attached directly to the frame.

The profiler may comprise a distance measuring unit 26 to measure the distance that the profiler has travelled. In the embodiment shown, the distance measuring unit is a measuring wheel 32 attached to an arm 28 which is pivotally attached 30 at either end of the frame 12. The measuring wheel 32 drives a shaft which directly couples its rotational motion to an encoder 34 for generating digital pulses related to the distance traveled.

Figure 11:
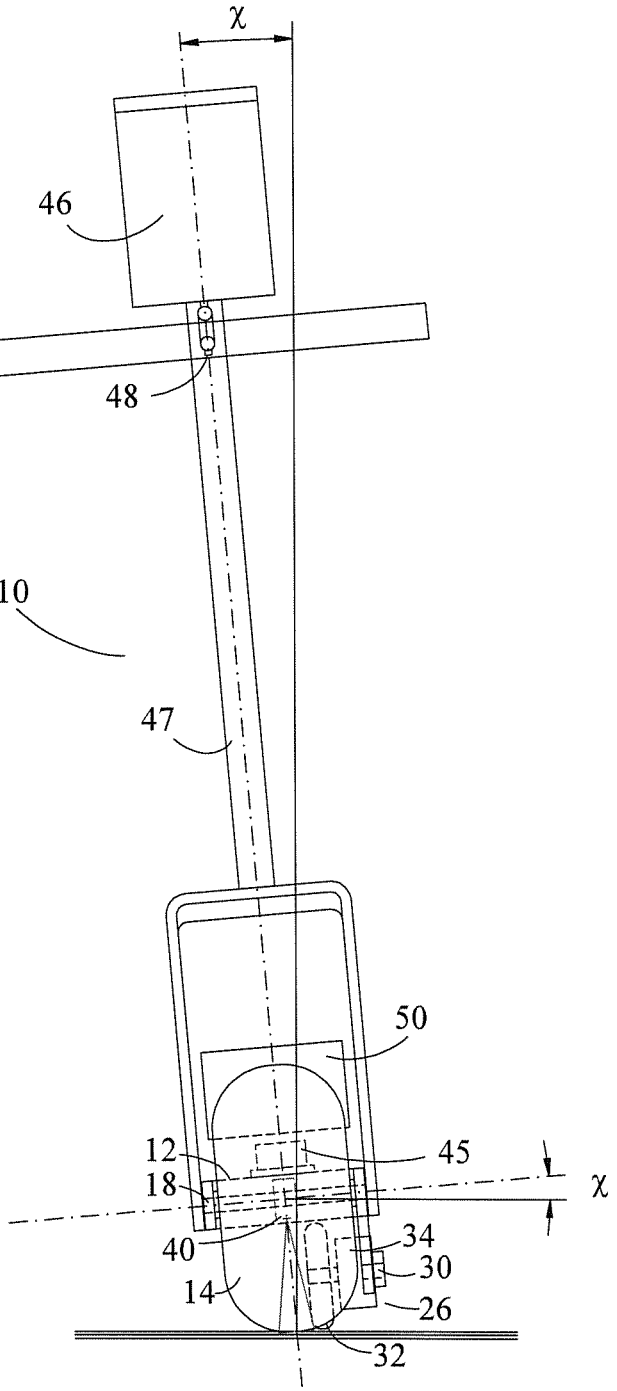
FIG. 11 is a front end view of the profiler according to another embodiment of the invention.

An inclination measuring apparatus, such as inclinometer 44, is mounted on the frame 12 with its measuring axis in the longitudinal direction of the profiler, i.e. along the path of travel. Inclinometer 44 measures the orientation of the frame 12 with respect to the horizontal position. If required for a specific application, a second inclinometer 45 may be provided near the center of the frame 12 with its measuring axis in the transverse direction, i.e. perpendicular to the path of travel. This embodiment is best illustrated in FIG. 11.

The vertical distance between the frame and the surface being profiled is is measured with at least two vertical distance apparatuses, which in the preferred embodiment are lasers 40, 42 provided near the center of the frame 12, approximately equidistant from the center of the frame 12 and substantially closer together than the distance between the rotational axes of the wheels 18, 20. For example, if the distance between the wheels is approximately 250 mm, the distance between the beams of light from the lasers 40, 42 may be approximately 25 mm. The lasers 40, 42 are aligned so that the points of laser beam light projected on the profile are collinear with the points at which the wheels contact the surface being profiled. The lasers 40, 42 may be of any suitable type, such as the point-type, round spot-type, elliptical spot-type or the line-type; a line-type laser is shown in FIG. 2, with a characteristic fan shape, but a suitable laser would ultimately be selected depending on the surface profile demands. The LMI™ Selcom™ RoLine™ or Gocator® series of 3D lasers are examples of lasers that are engineered for the challenges of pavement surface profiling and suitable for this application. If the lasers are of the line-type or three dimensional "3D"-type, the line is preferably projected perpendicular to the path being profiled, that is, in the transverse direction. Line lasers are useful for measuring the profile over a region such as the width of a typical automobile tire. Collecting a multiplicity of distance sample data over a region helps to reduce the influence on the accuracy of the data of macrotexture such as rock chips, tining or grinding, either longitudinally or transversely. Generally the laser line width should be several times larger than the largest texture feature, such as the size of rock chips in an aggregate cement paving mixture. The multiple samples collected by the line-type laser in the transverse direction may simply be averaged to a single value, however it is preferable to include only the values that would contact a tire passing over the surface and eliminate, or to bridge over, values that would not contact a tire, such as cracks or other negative going features. Such tire bridging algorithms are known and should be applied to the transverse line laser data.

Figure 9:
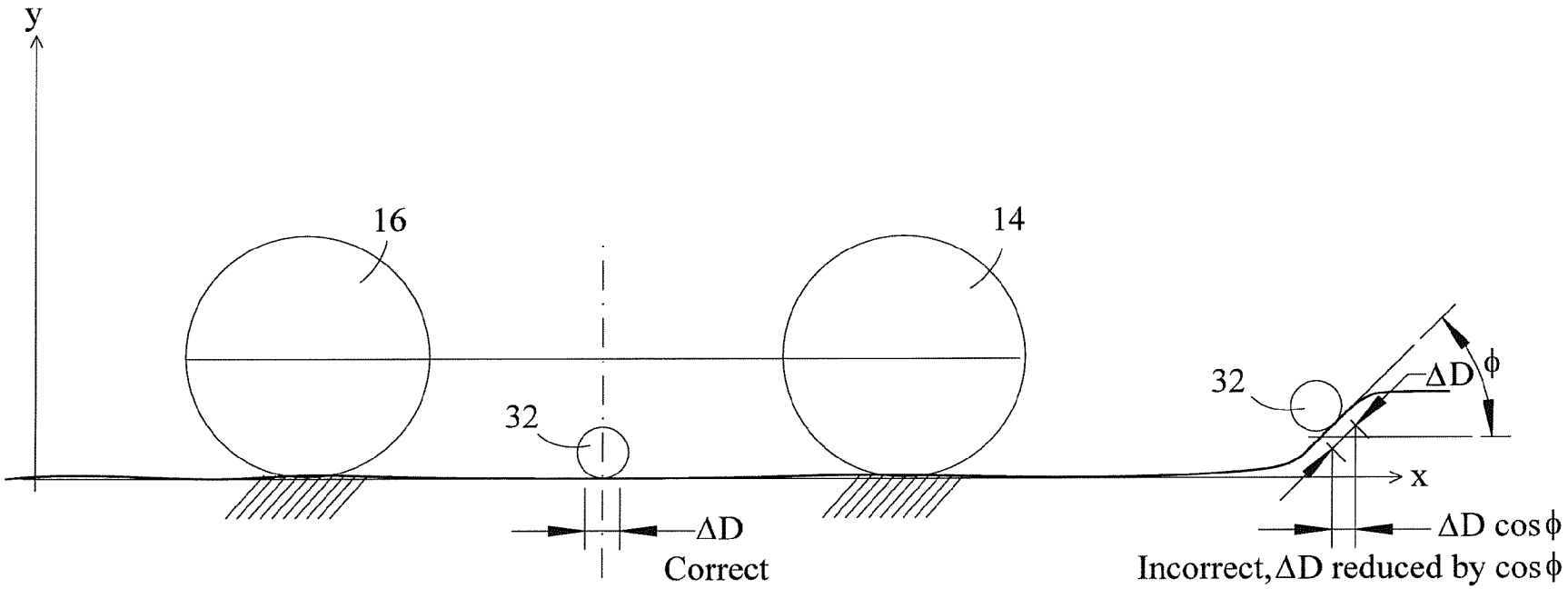
FIG. 9 is a schematic diagram illustrating the limitations of a profiler having a distance measuring wheel located away from the mid-point of the profiler.

The measuring wheel 32 is preferably located approximately mid-way between lasers 40, 42, in order to ensure it measures the same distance travelled as is "seen" by the lasers 40, 42 traversing the profile to be measured. Alternatively, a distance measuring device may be coupled to the rotational axis of either wheel. However it may be necessary to adjust the calculations, as a unit located off-centre may not measure the distance changes observed by the lasers as accurately as would a unit that is placed near the mid-point of the lasers, as best illustrated in FIG. 9.

Referring again to FIGS. 1 to 3, a handle 47 is attached to frame 12. An operator interface, such as a cabinet 46, is secured to the handle 47. Cabinet 46 may comprise any suitable interface means, such as a keyboard, touchscreen and/or display screen, to allow the operator to control the profiler, including seeing and controlling data input, output, system information, communication, and provision of information. If preferred, the cabinet 46 may be secured with bracket 48 that is adjustable to allow the operator to see it properly, regardless of the ground angle or the lighting conditions.

An enclosure 50 attached to the frame 12 contains the operational equipment necessary to operate the profiler. For example, the enclosure 50 contains the computer and memory 58 required to acquire and apply the signals and readings obtained from the measuring devices and other apparatus carried on the profiler, including the distance measuring unit 26, one or both inclinometers 44, 45 and [to] the distance measuring lasers 40, 42. It may also obtain information from any other sensors that may be provided, such as a temperature sensor 43. Enclosure 50 may also contain batteries 52 or any other suitable power supply, internal sensors such as a temperature sensor 51 and battery voltage monitor 53, and signal conditioning equipment including amplification and filtering 54 and an integrated computer hardware interface 56 containing suitable apparatus such as a real time clock, distance pulse counters, digital input/output and multi-channel 16 bit analog to digital converter.

Data acquisition is controlled through the operator interface 46. Under control of the computer 58 the distance is measured using distance measuring unit 26 which sends electrical pulses representative of the distance traveled to counters on the hardware interface board timer in order to trigger acquisition (i.e. digital conversion and storage) of analog voltages at appropriate distances. The analog voltages from the inclinometers 44, 45, distance measuring lasers 40, 42, temperature sensor 43, and batteries 52 are acquired by the multi-channel 16 bit analog to digital converter on the hardware interface board 56.

Computer 58 periodically obtains signals from all measuring devices attached to the profiler, preferably substantially simultaneously measuring the total longitudinal distance travelled, the inclination of the frame and the vertical distances seen by the two lasers. This may be most simply done at constant distance intervals $\Delta D$, such as 1 mm. It is important to capture data from all devices at the same instant in order for the algorithm of the method to provide the most accurate profile results. Conveniently the total longitudinal distance travelled is acquired by counting pulses from the optical encoder, while the inclination is obtained from the inclinometer and the two vertical distances are obtained from the lasers by converting voltages from these devices to their corresponding digital forms using an analog to digital converter with multiple analog inputs. Alternatively, instead of constant distance intervals, measurements may be taken at constant time intervals or any other suitable interval. For example, the computer 58 may use a real time clock to determine when to obtain the measurement signals, namely at intervals of constant time such as 1 msec. Distance change $\Delta D$ may be determined by inspection of the distance travelled at each 1 msec interval, although it may not have a constant value from interval to interval, if the speed of the profiler is not constant.

Calculations

Figure 4:
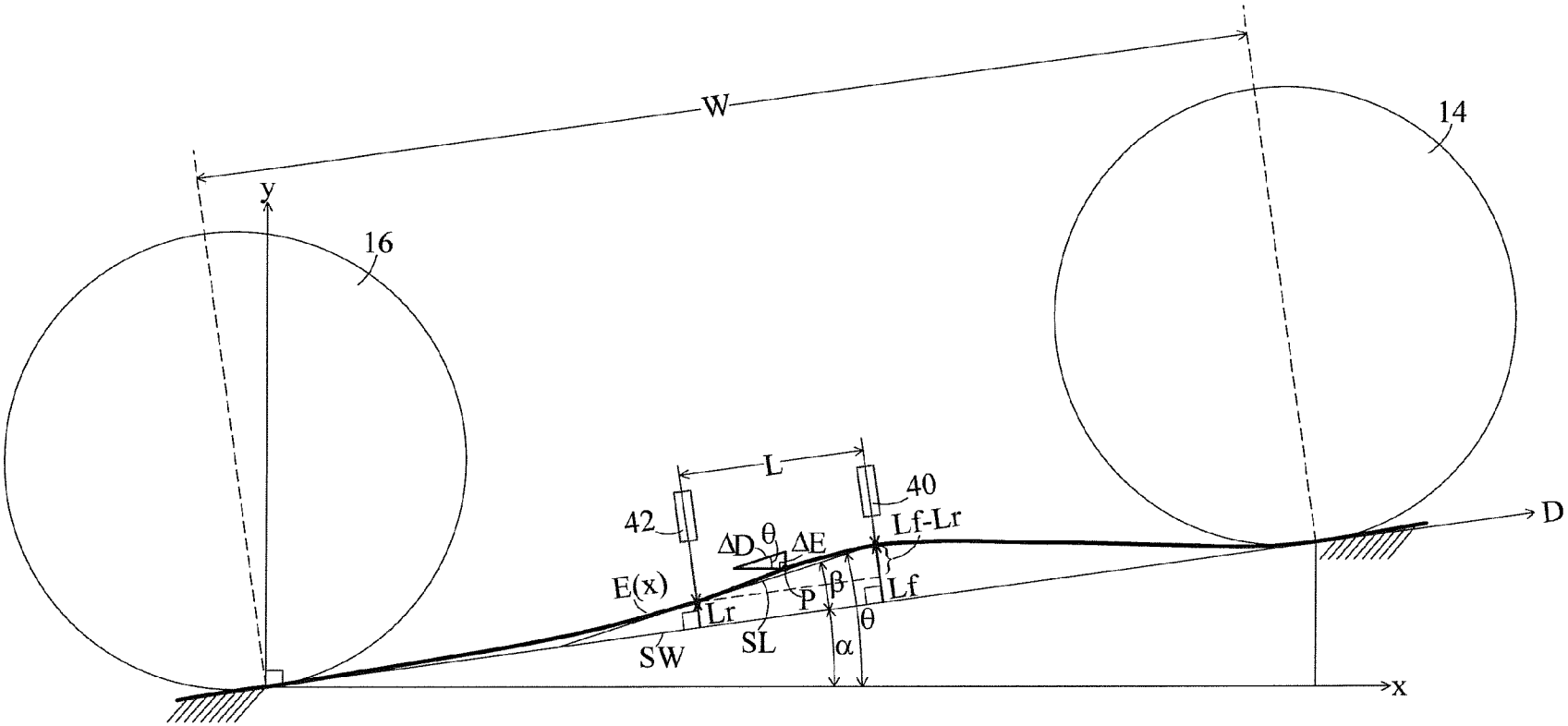
FIG. 4 is a schematic diagram illustrating the geometry applied to create a surface profile.
Figure 5:
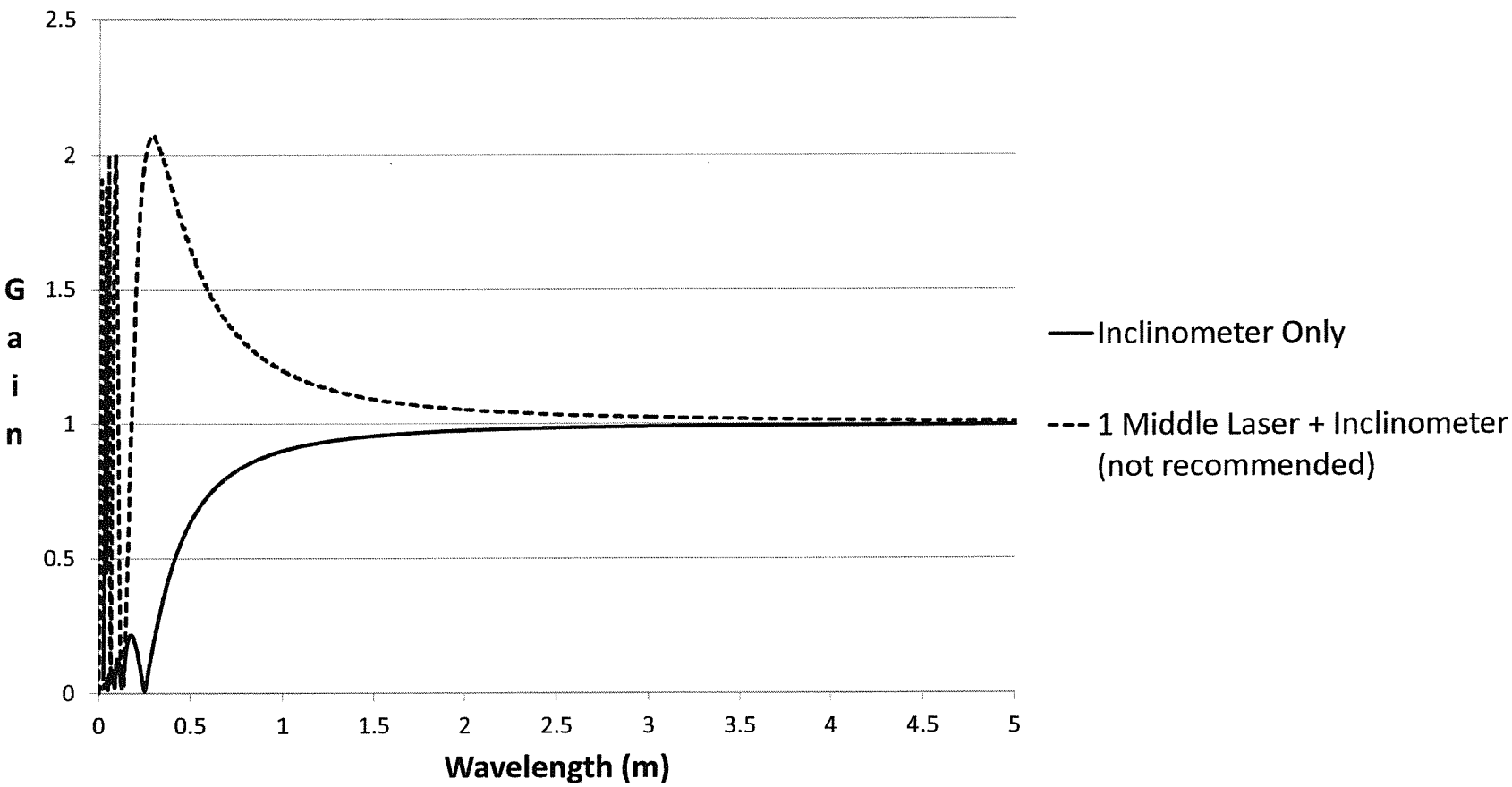
FIG. 5 is a graph of comparative wavelength responses of a profiler with an inclinometer only and a profiler that adds the profile obtained by a single laser to the elevation profile derived from an inclinometer.

Referring now to FIG. 4, the invention uses the following method to produce a mathematical series that accurately represents the surface profile.

First, the following constants are acquired:

W is the distance between the rotational axes of the wheels, in meters. While W is not used directly in the calculation of the profile elevation series it does define the wavelength at which the inclinometer frequency response rolls off to zero and the lasers take over. The wheels and lasers must be collinear for smooth and accurate transition between inclinometers and lasers.

L is the distance between the measuring light beams emitted from the lasers, in meters. The lasers are preferably substantially equidistant from the mid-point of the frame.

$\alpha$ is the angle between the frame and the horizontal plane of the earth in radians, as measured by the inclinometer.

$L_f$ is the difference between the distance to the surface, as measured by the front laser, and a line SW connecting the points at which the front and rear wheels contact the surface as shown in FIG. 4. $L_r$ is the difference between the distance to the surface, as measured by the rear laser, and the same line. $L_f$ and $L_r$ are measured in meters. The points where the laser beams contact the surface define a line, labeled in FIG. 4 as SL. The angle between line SL and line SW is $\beta$.

$\theta$ is the angle between SL, the line connecting the points where the laser beams contact the profile surface, and the X axis, which is the horizontal plane of the earth, meaning that $\theta=\alpha+\beta$.

We can see that:

$$\tan\beta = \left(\frac{(L_f - L_r)}{L}\right)$$

or inverted:

$$\beta = \tan^{-1}\left(\frac{(L_f - L_r)}{L}\right)$$

There is a continuous elevation profile function $f(x)$ called $E(x)$:

$$y=E(x)$$

For a point P on the profile function $E(x)$ mid-way between the rotational axes of the wheels and mid-way between the lasers, using principles of differential calculus, the slope at point P is:

$$\text{slope} = \frac{dy}{dx}$$

For a right angle triangle having point P at its lower corner, the hypotenuse has the slope of a tangential line intersecting P that forms the angle θ with the horizontal plane of the earth. The slope at point P is given by the angle θ. The mean value theorem states that a point P on the profile between the points of contact of the lasers on the profile must have the same slope as that defined by the points of contact of the lasers on the profile. We estimate that this value occurs at the mid-point between the lasers:

$$\text{slope} = \sin(\theta)$$

$$\sin\theta = \frac{dy}{dx}$$

We see that for a very small incremental change in horizontal distance Δx there will be a corresponding very small change in elevation ΔE according to the profile slope at point P as determined by the angle θ. For very small incremental changes in horizontal distance Δx, for example less than 1 mm, and elevation ΔE:

$$\sin\theta = \frac{\Delta E}{\Delta x}$$

ΔD is the distance travelled by the profiler 10 along the surface being measured. The distance is preferably measured at or very near the mid-point between the lasers for greatest accuracy. Otherwise, a ΔD error may be introduced wherever the slope at the location of the non-contact sensors differs from the slope at the location of the distance sensor. As an example, FIG. 9 illustrates a configuration with a measuring unit remote from the midpoint of the profiler frame. Clearly there can be situations where the midpoint profile is horizontal but the remote distance measuring wheel traverses up a bump or down a dip, where the profile has large positive or negative slope. In this example the distance measuring unit 26 will record a larger value of ΔD than the actual value observed at the mid-point of only ΔD cos ϕ. The opposite may also occur. The ΔD error results in an incorrect calculation of ΔE and an incorrect mathematical series representing the profile elevations.

In summary:

$$\sin\theta = \frac{\Delta E}{\Delta D}$$

$$\Delta E = \Delta D \sin\theta$$

$$\Delta E = \Delta D \sin(\alpha + \beta)$$

-continued $$\Delta E = \Delta D \sin\left(\alpha + \tan^{-1}\left(\frac{(L_f - L_r)}{L}\right)\right)$$

And to build a mathematical series accurately representing the profile from m samples of data, starting at elevation $E_0$, sampled every $\Delta D_n$ distance interval, the resulting end distance $E_m$ may be defined as follows:

$$E_m = E_0 + \sum_{n=1}^{m}\left(\Delta D_n \sin\left(\alpha_n + \tan^{-1}\left(\frac{(L_{fn} - L_{rn})}{L}\right)\right)\right)$$

$E_0$ may be taken from existing records for the elevation above sea level of the test site. Alternatively, a relative measure may be sufficient for the purposes of the profile data such that $E_0$ is set to zero.

In order to build the profile at every n distance interval it is necessary to acquire the values $\Delta D_n$, $\alpha_n$, $L_{fn}$ and $L_{rn}$ from the measuring devices. Therefore, at any given point along the profile, the necessary readings are acquired from the distance measuring unit, the inclinometer and the lasers.

Note that the lasers may be removed from the apparatus, which would continue to function as an accurate profiler using only $\alpha_n$, therefore making $L_{fn}$ and $L_{rn}$, and consequently $\beta_n$, equal to zero. The profiler frequency response would roll off toward and become zero at W.

Calculating the Profile

The data collection process is initiated by the operator, and continues until the operator stops the process. Once stopped, the data collected can be saved to a USB-connected flash drive or other storage device. Also, the operator may perform diagnostics and calculations such as computation of roughness indices such as the IRI.

The following process is used to measure the profile. First, a benchmark survey data may be used to establish the local elevation as $E_0$ or the starting elevation may simply be set to 0. Then, at suitable time intervals Δt, such as every millisecond, or every incremental distance ΔD, such as every millimeter, a measuring subroutine is initiated, during which the following steps are performed:

1. Acquire all raw data from measuring devices using input hardware interfaces. This step generally involves obtaining information about the angle of the frame 12 from the inclinometer 44 and the distance between each of the lasers 40, 42 and the ground. The data is preferably all acquired substantially simultaneously, for example within one millisecond, because using precise geometry and precise measurements at each position of the profiler along the path will increase the accuracy of the surface profile. Measurements from the is measuring devices are preferably conditioned to remove noise and improve quality prior to performing calculations. Analog voltage signals entering the multi-channel analog to digital converter may be provided anti-aliasing filters. "Anti-aliasing" involves the application of passive resistor-capacitor low pass filters to incoming analog signals to limit the frequencies applied to the inputs of analog to digital converters to one-half of the digital sampling frequency, which is known as the Nyquist frequency, to avoid digitization errors. Digital values derived from the analog to digital converter may be digitally filtered using a band pass digital filter that passes only signal frequencies containing useful information.

2. Determine the distance travelled. In the embodiment shown, this is accomplished by accumulating the counts of electrical pulses from the longitudinal distance measuring unit 26 and dividing by a scaling factor that converts the number of pulses to a distance $D_{new}$ travelled along the profile, in meters. However, any method suitable to accurately obtain and provide the distance travelled by the profiler may be employed.

3. Determine the incremental distance ΔD travelled. This simply uses the formula:

$$\Delta D = D_{new} - D_{old}$$

where $D_{old}$ is the distance travelled and stored during the iteration of the measurement subroutine. ΔD may be as small as approximately 1 mm and may vary depending on speed of the profiler but the method is generally independent of speed. The current distance value $D_{new}$ is stored for use at the next measurement interval as $D_{old}$.

4. Convert the data acquired into useful values. This step involves scaling digital values from the analog to digital converter to voltages and then to engineering quantities of angles in radians and distances in meters. The value of α obtained from the inclinometer will be in radians. The distance measured by the front laser distance measuring device is $L_f$ and the distance measured by the rear laser is $L_r$, both being directed vertically downward and perpendicular to the frame. $L_f$ and $L_r$ from the distance measuring lasers will be converted to meters. The lasers are normally scaled to produce 0 to 10 volts for 16 to 120 mm of distance, but by simple scaling adjustments consisting of adding an offset and inverting the range, it is possible to obtain values of $L_f$ and $L_r$ that represent the distances between the points where the lasers strike the surface of the profile (i.e. along line SL) and the line SW, which extends between the points where wheels contact the surface of the profile pavement. $L_f$ and $L_r$ will have a positive value where the profile is higher than the line SW, and a negative value where the profile is below the line SW.

5. Calculate the nth incremental change in elevation $\Delta E_n$ Using the Formula:

$$\Delta E_n = \Delta D_n \sin\left(\alpha_n + \tan^{-1}\left(\frac{(L_{fn} - L_{rn})}{L}\right)\right)$$

$\Delta E_n$ is then added to the accumulated elevation series as:

$$E_n = E_0 + \Delta E_1 + \Delta E_2 \ldots + \Delta E_n$$

6. Return to step 1 at the next increment.

The mathematical elevation series created captures within the resulting profile all wavelengths from L to the longest wavelengths of interest. At L, the gain of the device becomes zero. Above L, all frequencies are captured without phase shift or distortion with the result that large and small profile features such as bumps, dips and cracks are captured with correct amplitude and longitudinal distance.

Figure 6:
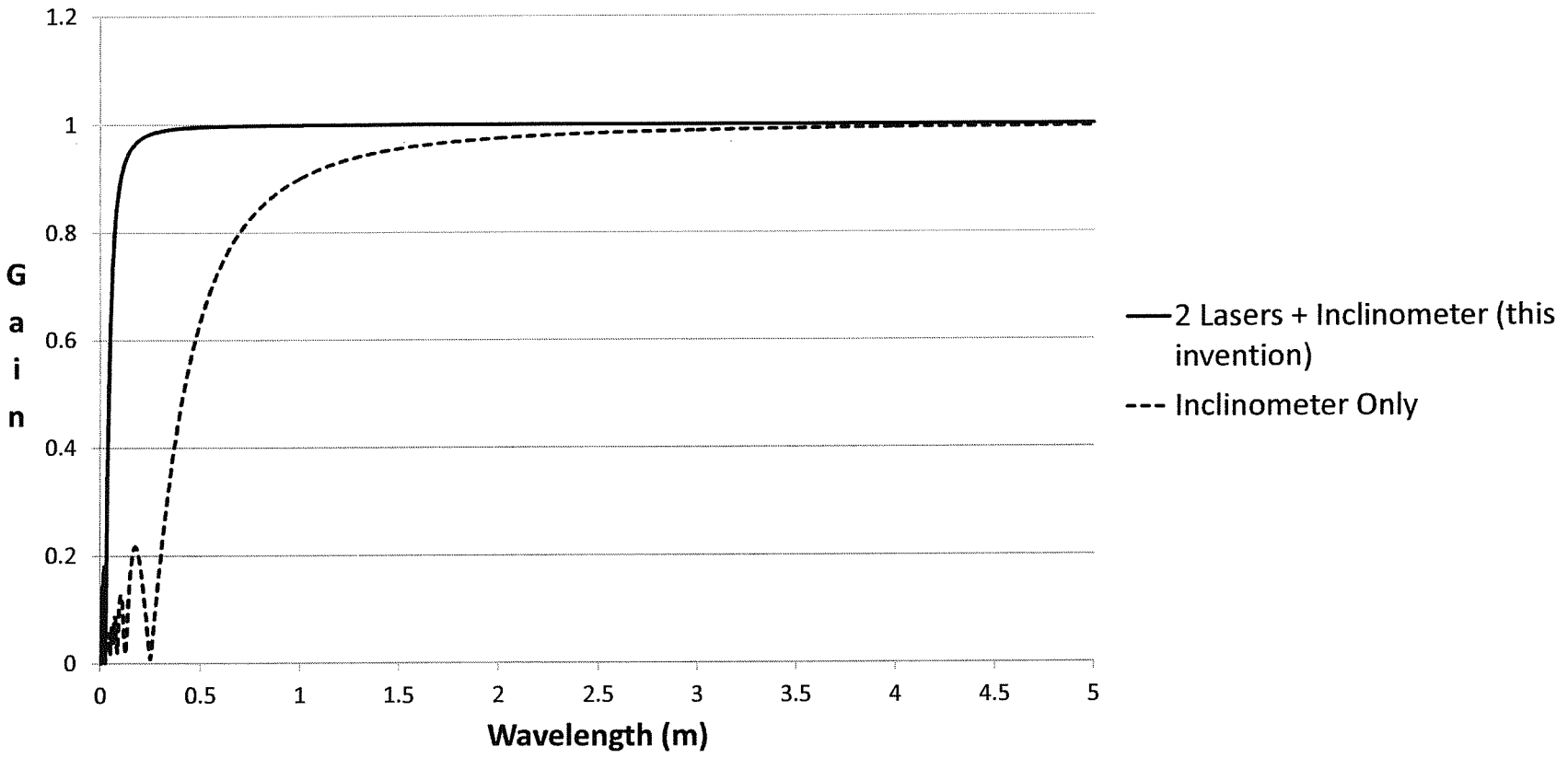
FIG. 6 is a graph of comparative wavelength responses of a profiler with an inclinometer only and a profiler having dual lasers and an inclinometer according to the invention.

FIG. 6 shows how the addition of dual lasers, in this example being lasers spaced about 25 mm apart mounted to a profiler having a wheelbase of about 250 mm, can extend the short wavelength response over the 25 mm-250 mm range, as compared to an otherwise identical profiler using only an inclinometer, that is where β is always zero because of the absence of lasers to derive β. Overall the performance of this configuration of dual laser/inclinometer profiler is smooth and accurate from 25 mm to effectively infinite millimeters, and in particular provides useful information in the region Δ the wheelbase separation distance W, down to laser separation distance L.

Figure 7:
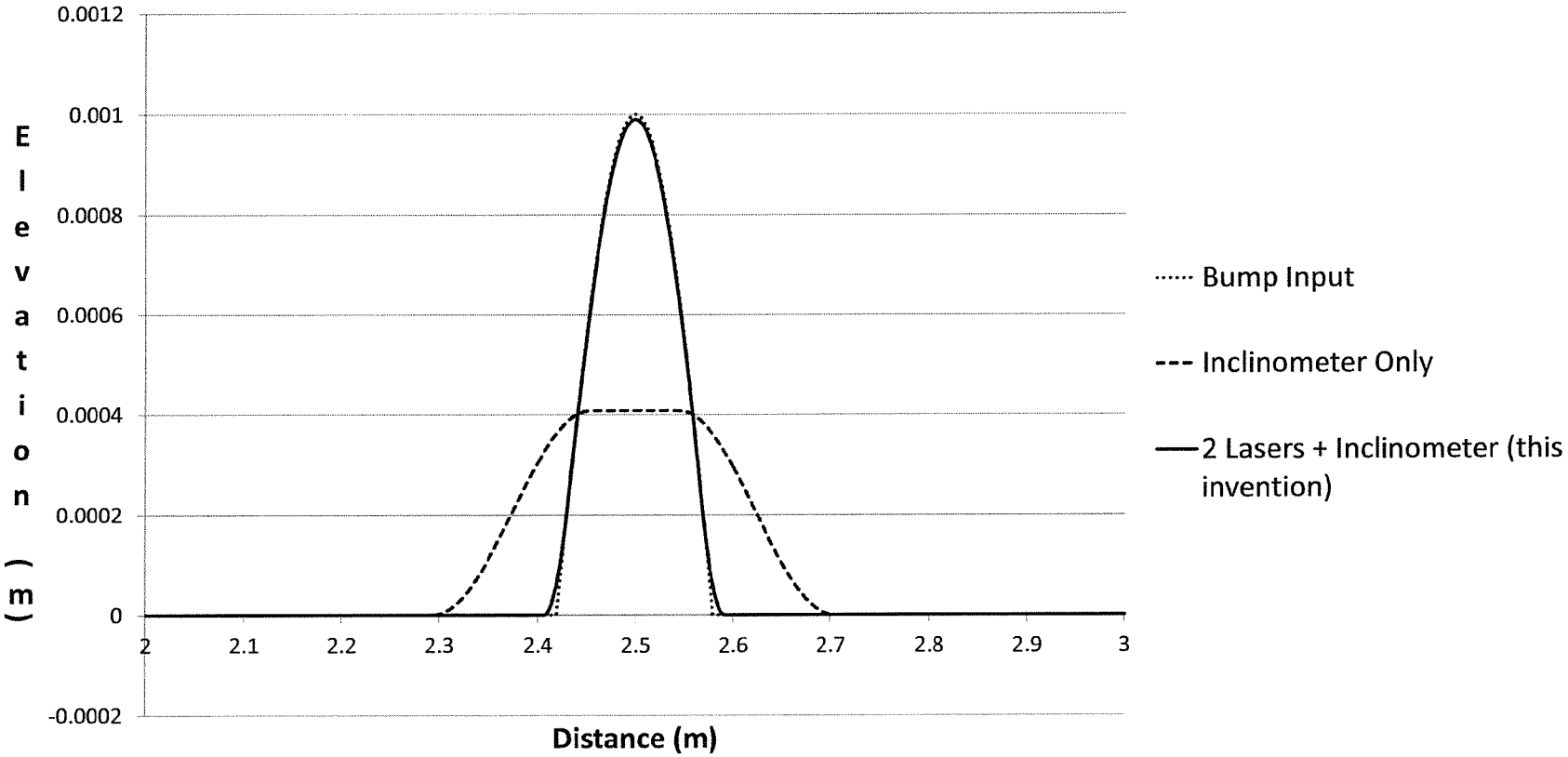
FIG. 7 is a graph of comparative profiler output to a 160 mm wide bump input for a profiler with an inclinometer only and a profiler having dual lasers and an inclinometer according to the invention.

FIG. 7 is a more specific example of the results from a profiler to which dual lasers have been added. The profiler, which has the same dimensions as that in the FIG. 6 example, is now able to measure the shape and amplitude of a bump on the profile having a half cycle sinusoidal shape with width of 160 mm. Without the addition of the dual lasers to the profile calculation, laser-derived angle β would always be zero and would not affect the profile. Using only the inclinometer, the wheels would contact points on the profile, spaced apart by W, tilt the frame and provide the inclinometer slope [a] α to calculate the profile. If the slope is positive the calculated profile increases; if the slope is negative the calculated profile decreases; if the slope is zero the elevation remains constant. On a generally horizontal profile, for profile features such as bumps or dips that are shorter than W, the wheels can actually straddle the feature with the result that the calculated profile remains constant while the feature is between the wheels. For this reason the profiler without dual lasers, that is with inclinometer only, is unable to provide a calculated profile that accurately records the height of profile features smaller than W. These calculated profile features will be both lower in height and wider than the actual feature, as shown in FIG. 7.

The profiler measures the total distance travelled along the surface of the profile, the summation of the $\Delta D_n$ values. This is normally sufficient since the true elevation values are most important and in most cases the D values are adequate for uses of the data. If the total distance travelled along the horizontal plane of the earth (the X axis) is required, then each $\Delta D_n$ value must be multiplied by the corresponding $\cos(\theta_n)$ before summing. Specifically:

$$\Delta X_n = \Delta D_n \cos \theta_n$$

Correction and Compensation

The measurement of the surface profile is accomplished using a combination of inclinometer measurements and laser measurements. The inclinometer is able to measure profile independently of the laser measurements using the formula:

$$\Delta E = \Delta D \sin(\alpha)$$

Figure 8:
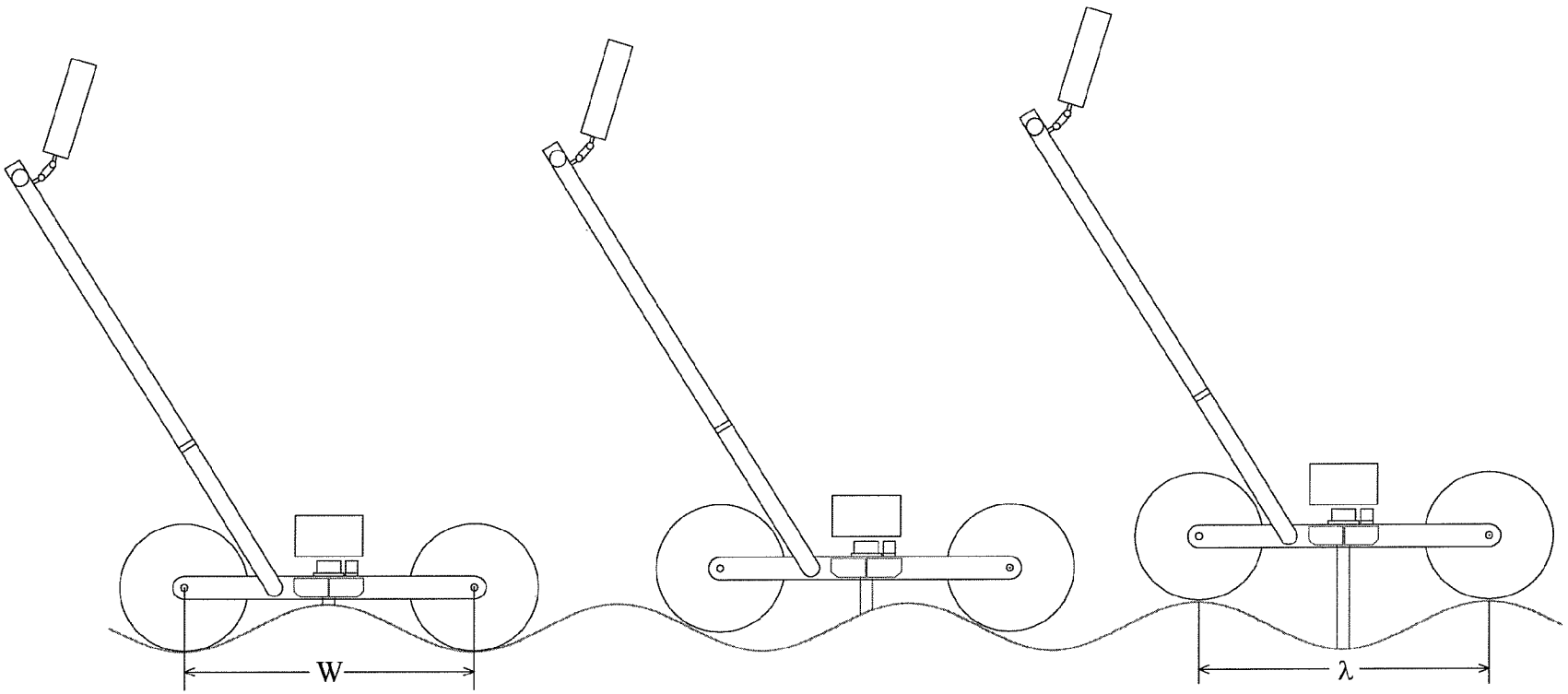
FIG. 8 is a schematic diagram illustrating the limitations of profiler responses for certain wavelengths, determined by the profiler wheel spacing.

However, as shown in FIG. 8, when the wavelength λ of any surface feature is equal to or is less than W, the inclinometer alone loses effectiveness, and the profiler is incapable of accurately detecting these features. Where the feature wavelength λ is equal to W, the profiler remains horizontal relative to the plane of the earth at all positions on the profile so the angle α measured by the inclinometer remains constantly at zero, meaning the response gain of the profiler is zero at this wavelength. The use of the lasers therefore extends the wavelength range of the invention into the range of λ between W and L, enabling high resolution measurement of surface features. For features having wavelengths λ between W and L, the combination of inclinometer and lasers work together to measure the profile using the formula:

$$\Delta E = \Delta D \sin\left(\alpha + \tan^{-1}\left(\frac{(L_f - L_r)}{L}\right)\right)$$

Figure 10:
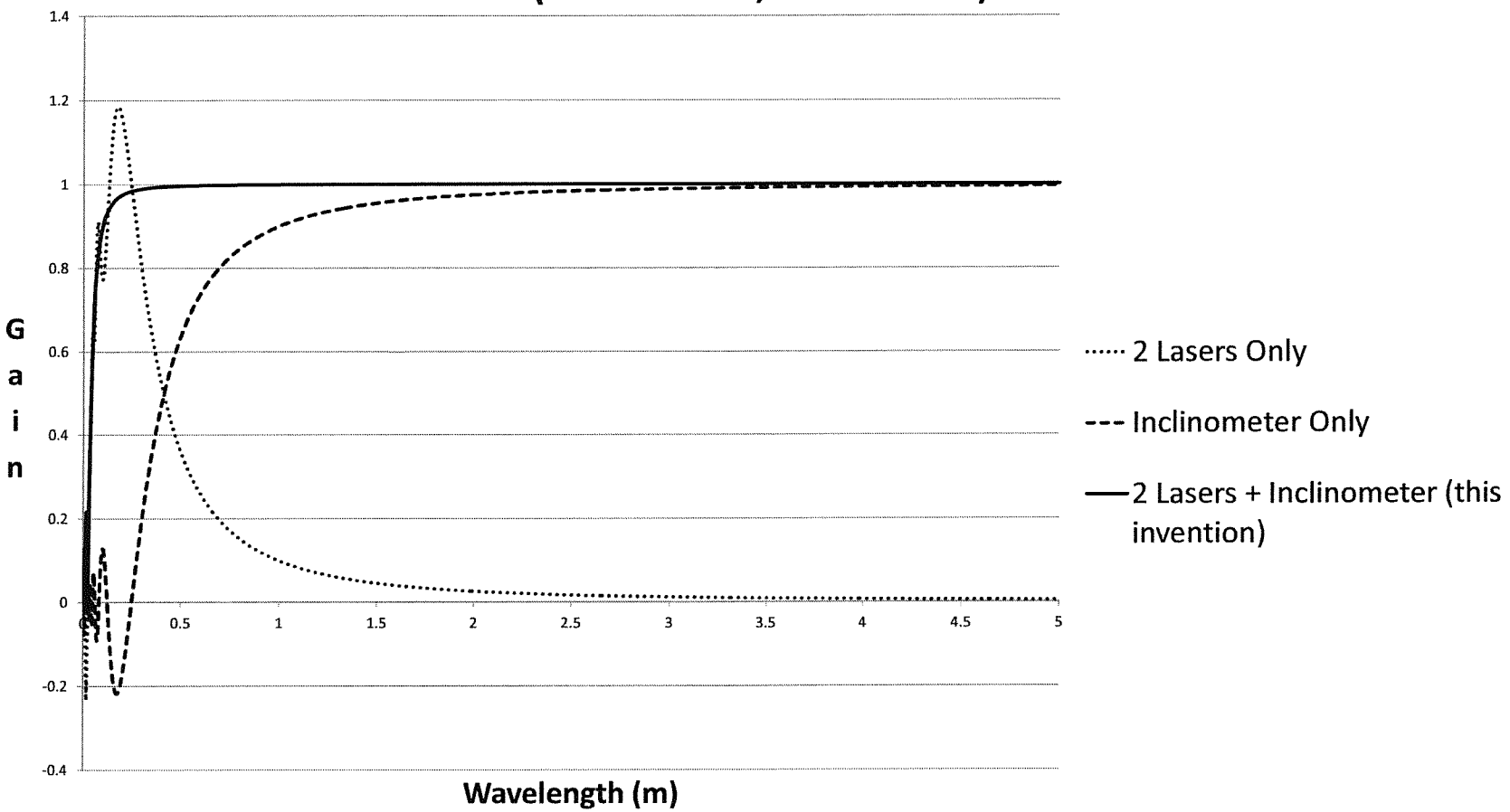
FIG. 10 is a graph of comparative wavelength response contributions to the profile measurement of an inclinometer alone, dual lasers alone, and a combination of the two.

FIG. 10 is a graph showing the contributions of the inclinometer alone and lasers alone, as compared to using the dual laser and inclinometer combination of the invention.

In practice, despite efforts to accurately calibrate and balance the front and rear lasers, it is possible that $L_f$ will not equal $L_r$ when the profiler is placed on a perfectly straight surface with or without tilting relative to the horizontal plane of the earth. Also for very long wavelength sine wave profiles, the distance measuring lasers "see" a straight line and produce no $L_fL_r$ or β signal. FIG. 10 shows that at 20 times W (5 m where W is 0.25m), the contribution of the lasers to the total profile, or their gain, is nearly zero compared to the inclinometer which is nearly 1.0. At 20 times W, the $L_f$ and $L_r$ signals will be very small relative to the resolution of the lasers or the analog to digital converters or will be buried in noise inherent in data acquisition systems. This may result in poor performance of the profiler if the long wavelength component of the $L_fL_r$ or β signal is not removed. Therefore it may be necessary to wavelength high pass filter $L_f$ and $L_r$ or the term:

$$\beta = \tan^{-1}\left(\frac{(L_f - L_r)}{L}\right)$$

using a high pass digital filter with a cutoff wavelength of approximately 20 times W. This involves filtering in the distance domain (cycles/meter) rather than the frequency domain (cycles/second) and requires the ΔD values to be fairly constant. In this way, even if $L_f$-$L_r$ or β is not exactly equal to zero for a perfectly straight profile, there will be no non-zero value of β that causes the profile elevation to wander and result in large elevation errors at the end of the profile, since the high pass digital filter will make $L_f$ and $L_r$ or β equal to zero for very long wavelengths. Filtering out very long wavelengths from the β signal as described requires the wheels and lasers be collinear to ensure the component of the profile contributed by the inclinometer is aligned with the component of the profile contributed by the lasers particularly through the crossover region at 20 times W.

A typical inclinometer is basically an accelerometer that responds to the direction of the acceleration of gravity using a pendulum that is balanced to the zero position by a miniature torque motor. The electrical current to the torque motor required to maintain the pendulum in the zero position is proportional to the sine of the angle of inclination and is the source of the voltage signal produced by the inclinometer. Such devices are also sensitive to acceleration of the inclinometer along the sensitive axis, such as may be caused by the operator pushing on the handle of the profiler to start it moving, and pulling on the handle to stop it. The inclinometer will also be sensitive to the normal acceleration and deceleration inherent in the walking motion of the operator. In order to correct this sensitivity, it may be necessary to calculate a compensating signal using high resolution distance information from the optical encoder or other distance measuring device, if the information is available. By differentiating the distance signal D twice, an acceleration signal A can be derived. This differentiation may be performed on the digital representation of distance obtained from the distance measuring unit. By appropriately scaling this acceleration with constant k, an equal and opposite compensation signal can be added to the inclinometer signal i to eliminate this issue. Specifically this is accomplished as follows:

dD/dt=velocity V dV/dt=acceleration A $i_{corrected}=i_{uncorrected}-k\ A$

In some cases, the longitudinal inclinometer produces an errant signal when tilted in the transverse direction, a characteristic known as cross-axis error. Cross-axis error is caused by misalignment between the axis of the sensing accelerometer element in the longitudinal inclinometer with its enclosure, or misalignment between the enclosure of the inclinometer with the longitudinal axis of the profiler. Either misalignment exposes the sensing accelerometer element to tilting in the transverse direction. As best shown in FIG. 11, if a transversely-aligned (or cross-axis) inclinometer 45 is provided to measure the angle χ between the horizontal plane of the earth and the frame in the transverse direction, it may provide information to correct the longitudinal inclinometer angle α for cross-axis error. The correction is applied to the voltage output from the inclinometer prior to conversion to angle. The longitudinal inclinometer voltage $V_\alpha$ is compensated for cross-axis error as follows.

$$V_{\alpha c} = V_\alpha + S_{\alpha\ to\ \chi} x \frac{V_\chi - V_{\chi\ offset}}{S_\chi}$$

where:

$V_{\alpha c}$ is the longitudinal inclinometer voltage, after compensation, in volts;

$V_\alpha$ is the longitudinal inclinometer voltage, before compensation, in volts;

$S_{\alpha\ to\ \chi}$ is the longitudinal inclinometer's (or α's) sensitivity to tilting in χ direction in volts/G, determined empirically;

$V_\chi$ is the transverse, or cross-axis, inclinometer voltage in volts;

$V_{\chi\ offset}$ is the transverse inclinometer voltage output measured when the inclinometer is set horizontal relative to the plane of the earth in volts, determined empirically; and $S_\chi$ is the full range sensitivity of the transverse inclinometer in volts/G.

Then the cross-axis compensated angle α is given by:

$$\alpha = \sin^{-1}\frac{V_{\alpha c}}{S_\alpha}$$

where $S_\alpha$ is the full range sensitivity of the longitudinal inclinometer in volts/G.

The present invention, given its high accuracy and repeatability, while finding uses in several industries and for many purposes, will be of particular value in both the contract management of new surface construction and as a reference standard for certification of other instruments.

The foregoing embodiment of the invention has been described as a rolling/walking profiler, having an operator to physically move the apparatus along the surface being profiled. However, it is also contemplated to provide a motorized drive mechanism for the apparatus, which can move the apparatus along the surface at a controllable speed. In a further alternative, the apparatus may comprise appropriate attachment means by which it can be attached to a motorized vehicle, which will then move the apparatus along the surface to be profiled, such as by towing or pushing.

In the foregoing specification, the invention has been described with reference to specific embodiments thereof. However, the scope of the claims should not be limited by the preferred embodiments set forth in the examples, but should be given the broadest interpretation consistent with the description as a whole. The specification and drawings are, accordingly, to be regarded in an illustrative rather than a restrictive sense.

What is claimed is:

[1. A surface profiling apparatus comprising:

a frame;

a plurality of wheels supporting said frame, at least two of said wheels being separated by a distance W and being aligned to contact a surface being profiled in a longitudinally collinear manner;

a longitudinal distance measuring apparatus supported by said frame;

a longitudinal inclination measuring apparatus supported by said frame to measure an angle α between said frame and said surface; and at least two vertical distance measuring devices, said vertical distance measuring devices being collinear with said collinear wheels and separated by a distance L.]

[2. The surface profiling apparatus of claim 1 wherein said vertical distance measuring devices are equidistant from the mid-point of said frame.]

[3. The surface profiling apparatus of claim 1 wherein each of said vertical distance measuring devices is a laser.]

[4. The surface profiling apparatus of claim 3 wherein said lasers are attached to said frame at a specified separation, and wherein said separation is shorter than the distance W.]

[5. The surface profiling apparatus of claim 3 wherein said lasers are equidistant from the mid-point of said frame.]

[6. The surface profiling apparatus of claim 1, wherein said longitudinal distance measuring apparatus is positioned between said collinear wheels.]

[7. The surface profiling apparatus of claim 1 wherein said longitudinal distance measuring apparatus is positioned between said vertical distance measuring apparatuses.]

[8. The surface profiling apparatus of claim 1, wherein said longitudinal distance measuring apparatus is rotationally linked to an axle of one of said wheels.]

[9. The surface profiling apparatus of claim 8 wherein said longitudinal distance measuring apparatus is an optical encoder.]

[10. The surface profiling apparatus of claim 1 wherein said longitudinal inclination measuring apparatus is an inclinometer.]

[11. The surface profiling apparatus of claim 1 further comprising a motorized drive adapted to move the profiling apparatus along the surface to be profiled.]

[12. The surface profiling apparatus of claim 1 further comprising attachment means by which the apparatus may be attached to a motorized vehicle to move the apparatus along the surface to be profiled.]

[13. The surface profiling apparatus of claim 1, further comprising an operator interface to control said profiling apparatus.]

[14. The surface profiling apparatus of claim 13 wherein said interface is associated with a cabinet associated with said frame.]

[15. The surface profiling apparatus of claim 14 wherein said cabinet houses operational equipment, said operational equipment being selected from the group consisting of: one or more internal sensors, a power supply, power level monitor, signal conditioning equipment, real time clock, distance pulse counters, digital input/output and multi-channel 16 bit analog to digital converter, computer and non-volatile memory.]

[16. The surface profiling apparatus of claim 1, further comprising a transverse inclination measuring apparatus, supported by said frame and oriented substantially perpendicular to said longitudinal inclination measuring apparatus, to measure a transverse angle χ between said frame and said surface.]

17. A method of profiling a surface using a surface profiling apparatus mounted on a plurality of wheels, at least two of said wheels being aligned to contact the surface in a longitudinally collinear manner, the method comprising:

acquiring data relating to:

a longitudinal distance ΔD travelled by said [profiler] *surface profiling apparatus* from a longitudinal distance measuring apparatus mounted on said [profiler] *surface profiling apparatus*;

an angle α of said [profiler] *surface profiling apparatus* relative to *a horizontal plane intersecting* said surface *at a location of one of said wheels where a point of the wheel, a vertical line and a line collinear with a diameter of the wheel intersect,* from a longitudinal inclination measuring apparatus *comprising a first inclinometer* mounted on said [profiler] *surface profiling apparatus*; and a vertical distance $L_f$ between said [profiler] *surface profiling apparatus* and said surface from a first vertical distance measuring apparatus mounted on said [profiler] *surface profiling apparatus*;

a vertical distance $L_r$ between said frame and said surface from a second vertical distance measuring apparatus mounted on said [profiler] *surface profiling apparatus*;

said first and second vertical distance measuring apparatuses being mounted collinearly with said wheels and separated by a distance L;

calculating an incremental change in surface elevation ΔE, using the formula:

$$\Delta E = \Delta D \sin\left(\alpha + \tan^{-1}\left(\frac{(L_f - L_r)}{L}\right)\right); \text{ and}$$

adding said incremental change to an accumulated elevation series which represents a profile of said surface.

18. The method of claim 17, wherein said method is applied at periodic intervals.

19. The method of claim 18 wherein said periodic intervals are at time increments, Δt.

20. The method of claim 19 wherein Δt is 1 millisecond.

21. The method of claim 18 wherein said periodic intervals are at longitudinal distance increments, ΔD.

22. The method of claim 21 wherein ΔD is 1 millimeter.

23. The method of claim 17, wherein said step of acquiring data further comprises acquiring data relating to a transverse angle χ of said [profiler relative to] *surface profiling apparatus between a horizontal plane above* said surface *and a line transverse to a longitudinal axis of a frame of said surface profiling apparatus,* from a transverse inclination measuring apparatus comprising a second inclinometer [supported by] *mounted on* said [profiler] *surface profiling apparatus* to correct said angle α for cross-axis error.

[24. The method of claim 23, wherein said method is applied at periodic intervals.]

[25. The method of claim 24 wherein said periodic intervals are at time increments, Δt.]

[26. The method of claim 25 wherein Δt is 1 millisecond.]

[27. The method of claim 24 wherein said periodic intervals are at longitudinal distance increments, ΔD.]

[28. The method of claim 27 wherein ΔD is 1 millimeter.]

29. A method of profiling a surface using a surface profiling apparatus mounted on a plurality of wheels, at least two of said wheels being aligned to contact the surface in a longitudinally collinear manner, the method comprising:

moving the [profiler] *surface profiling apparatus* a longitudinal distance increment $\Delta D$;

obtaining a vertical distance $L_f$ *between said surface profiling apparatus and said surface* from a first vertical distance measuring device, and a vertical distance $L_r$ *between said surface profiling apparatus and said surface* from a second vertical distance measuring device, said first and second vertical distance measuring apparatuses being mounted *on said surface profiling apparatus* collinearly with said *at least two* wheels and separated by a distance L;

calculating a first angle $\beta$ between said vertical distances $L_f$, $L_r$ and said distance L using the formula:

$$\beta = \tan^{-1}\left(\frac{(L_f - L_r)}{L}\right);$$

obtaining an angle $\alpha$ of said [profiler] *surface profiling apparatus* relative to *a horizontal plane intersecting* said surface *at a location of one of said wheels where a point of the wheel, a vertical line and a line collinear with a diameter of the wheel intersect,* from a longitudinal inclination measuring apparatus *comprising a first inclinometer* mounted on said [profiler] *surface profiling apparatus*;

calculating an incremental change in surface elevation $\Delta E$, using the formula:

$$\Delta E = \Delta D \sin(\alpha+\beta);$$

and adding said incremental change to an accumulated elevation series which represents a profile of said surface.

30. The method of claim 29, wherein said method is applied at periodic intervals.

31. The method of claim 30 wherein said periodic intervals are at time increments, $\Delta t$.

32. The method of claim 31 wherein $\Delta t$ is 1 millisecond.

33. The method of claim 30 wherein said periodic intervals are at longitudinal distance increments, $\Delta D$.

34. The method of claim 33 wherein $\Delta D$ is 1 millimeter.

35. The method of claim 29 comprising the further step of correcting said angle $\alpha$ for cross-axis error using a transverse angle $\chi$, said transverse angle $\chi$ being obtained from a transverse inclination measuring apparatus [supported by] *comprising a second inclinometer mounted on* said [profiler] *surface profiling apparatus.*

* * * * *